United States Patent Office 3,354,034
Patented Nov. 21, 1967

3,354,034
NOVEL CATIONIC STARCH DERIVATIVES
Wadym Jarowenko, Plainfield, N.J., assignor to National Starch and Chemical Corporation, New York, N.Y., a corporation of Delaware
No Drawing. Original application Mar. 23, 1964, Ser. No. 354,114, now Patent No. 3,331,833, dated July 18, 1967. Divided and this application Jan. 3, 1967, Ser. No. 606,568
2 Claims. (Cl. 162—175)

ABSTRACT OF THE DISCLOSURE

This invention relates to the manufacture of paper whereby a novel cationic starch, prepared by reacting starch with ethyleneimine, is added to a dispersion of pulp and the paper composition thereof.

This application is a division of my copending application Ser. No. 354,114, filed Mar. 23, 1964, now Patent No. 3,331,833.

This invention relates to a method for improving the properties and performance of tertiary amino alkyl starch ethers and, particularly, to the novel derivatives thus produced.

It is the object of this invention to provide novel derivatives of tertiary amino alkyl starch ethers, said derivatives being characterized by their improved performance when utilized as wet-end additives in the manufacture of paper wherein their presence yields superior pigment retention along with an overall increase in the strength of the resulting paper. Various other objects and advantages of this invention will be apparent upon a reading of the disclosure which follows hereinafter.

In U.S. Patent 2,813,093, Nov. 12, 1957, Ser. No. 360,818, filed June 10, 1953, there is described a method for preparing a novel class of cationic tertiary amino alkyl starch ether derivatives corresponding to the formula:

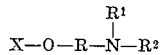

wherein X is starch, R is a radical selected from the group consisting of alkylene and hydroxyalkylene radicals, and each of $R^1$ and $R^2$ is a radical selected from the group consisting of alkyl, aryl and aralkyl radicals. Hereinafter, it is to be understood that when reference is made to "tertiary amino alkyl starch ethers" it is the above described derivatives which are being referred to.

The above described derivatives have been employed in a wide variety of applications but have been especially useful as beater and/or headbox additives in the manufacture of paper wherein their inherent cationic charge significantly improves the retention of inorganic pigments by the cellulose pulp and substantially increases the ultimate strength of the finished paper. Of late, however, various attempts have been made in an effort to still further improve upon the overall performance of these novel starch derivatives so as to permit their use at lower concentrations while still providing comparable or superior results. These efforts at improvement of the tertiary amino alkyl starch ethers have involved various treatments such as esterification, etherification, cyanoethylation, amidoethylation or hydroxypropylation and have, so far, proven to be ineffective and/or detrimental.

I have now discovered that the novel class of derivatives resulting from the reaction between the above described tertiary amino alkyl starch ethers with ethyleneimine offer a surprisingly improved degree of performance over the tertiary amino alkyl starch ether bases from which they are prepared. The novel derivatives of this invention are thus those starch derivatives corresponding to the following formula:

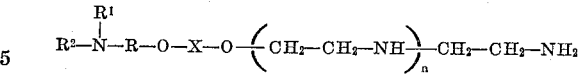

wherein X is starch, R is a radical selected from the group consisting of alkylene and hydroxyalkylene radicals, each of $R^1$ and $R^2$ is a radical selected from the group consisting of alkyl, aryl and aralkyl radicals, and $n$ is an integer having a value which is at least 0.1.

The novel derivatives of this invention may thus be described as tertiary amino alkyl starch ethers having one or more substituent side chains, each of which has at least 0.1 or more ethyleneimine units, i.e.

$$-(-CH_2-CH_2-NH_2)$$

each of said side chains being grafted onto the starch molecule via a hydroxyl group of said starch molecule. It may also be noted that it is possible for a small proportion of the ethyleneimine side chains to be grafted onto the starch molecule via the substituent tertiary amino alkyl group in which case these novel derivatives would have a structure selected from the following group:

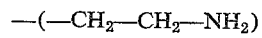

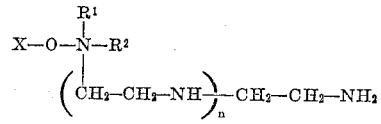

and

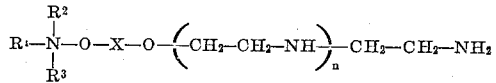

wherein X, R, $R^1$, $R^2$, and $n$ are identical in meaning to the corresponding symbols in the above given formula and wherein $R^3$ is a radical selected from the group consisting of the $-CH_2-CH_2-NH_2$, $-CH_3$, and $$-CH_2-CH_3$$

radicals.

For purposes of brevity, ethyleneimine will be, in this disclosure, hereinafter referred to by the abbreviation "EI."

The tertiary amino alkyl starch ethers which, in essence, comprise the starch bases or intermediates for the novel starch reaction products of this invention are more specifically exemplified by the dialkyl amino alkyl and dialkyl aminohydroxyalkyl ethers of starch as well as by their corresponding aryl and aralkyl derivatives. Of particular interest for use as a base in the process of the subject invention is the diethyl amino ethyl ether of starch which is produced by the reaction of starch with diethyl amino ethyl chloride hydrochloride. In general, this class of tertiary amino alkyl starch ethers are prepared by etherifying a starch with an etherifying agent selected from the group consisting of dialkyl amino alkyl halides, dialkyl amino alkyl epoxides and the corresponding compounds containing aryl groups in addition to the alkyl groups. In practice, these derivatives are often prepared in the form of their acid salts such, for example, as their hydrochloride salts, by conducting the reaction with the acid salt of the chosen etherifying agent and subsequently neutralizing the resulting derivative with an acid. These tertiary amino alkyl starch ethers may also be subsequently treated so as to be converted into their quaternary ammonium salts and both the quaternary ammonium salts and the acid salts of these tertiary amino alkyl starch ethers, as well as the free amine form of these starch ethers, may be used in preparing the novel derivatives of this invention. Moreover, one may also employ pre-gelatinized, i.e. cold water soluble, forms of these tertiary amino alkyl starch ethers which may be prepared, for example, by passing their aqueous slurries over heated metal drums.

The etherifying reaction utilized for the preparation of these tertiary amino alkyl starch ethers may be conducted on any amylaceous substance such as untreated starch as well as starch conversion products and starch derivatives including dextrinized, hydrolyzed, oxidized, esterified, and etherified starches still retaining amylaceous material. These starches may be derived from any sources including corn, wheat, potato, tapioca, waxy maize, sago, rice, and high amylose corn as well as the amylose and amylopectin fractions of any of the latter starch sources. Additional information relating to the preparation of these tertiary amino alkyl starch ethers may be obtained by consulting U.S. Patent 2,813,093.

Although the concept of reacting EI with polyhydroxy compounds such as cellulose, polyvinyl alcohol and raw starches is admittedly old in the art, it is nonetheless extremely surprising that from among all of the many reagents which have heretofore been used to treat the above described tertiary aminol alkyl starch ethers in an effort to improve their performance as papermaking additives, only EI was found to be capable of effecting the desired results.

It is also interesting to note that the presence of the tertiary amino alkyl substituent group in the novel products of this invention plays an essential part both with respect to their actual preparation as well as with respect to their performance as paper making additives. Thus, with regard to the reaction utilized in their preparation, the teachings of the prior art as exemplified respectively by Kerr and Neukom in Die Stärke, 4, 10,255; and U.S. Patents 2,972,606 and 2,656,241, have disclosed, and I have confirmed, that the treatment with EI of raw, underivatized starches, as well for that matter as the treatment with EI of other polyhydroxy compounds such as cellulose and polyvinyl alcohol, is ordinarily enhanced by the presence of a suitable catalyst in the reaction system in order to be able to obtain a reaction resulting in any appreciable increase in the nitrogen content of the resulting derivative over that of the raw starch base. In my novel process, on the other hand, I have achieved remarkable increases in the nitrogen content of my novel derivatives over the nitrogen content of their tertiary amino alkyl starch ether intermediates without the need for employing any additional catalysts. As for their performance as paper additives, I have found that the products resulting from the reaction of EI with raw starch have only limited ability to function as pigment retention agents and they effect only slight increases in the strength of the resulting paper sheets. In contrast, my EI derivatives of tertiary amino alkyl starch ethers are exceedingly effective pigment retention agents and produce a considerable increase in the strength of the resulting sheets.

It may be noted that in addition to EI, certain of its low molecular weight alkyl homologs may also be used in the process of this invention. These applicable homologs include, for example, propyleneimine, N-butylethyleneimine; 2-methylethyleneimine; 2,2-dimethylethyleneimine, trimethyleneimine, and N-methylethyleneimine. The use of these homologs is, however, of less interest in the process of this invention as compared with the use of EI inasmuch as they are more expensive than EI, react with less efficiency and provide derivatives which ordinarily lack an adequate degree of dispersibility in water which would permit their convenient use as paper making additives. In view of these deficiencies, the process of this invention will be, hereinafter, described solely in relation to the use therein of EI.

In brief, the actual process utilized for the preparation of the novel derivatives of this invention comprises the reaction of EI with a tertiary amino alkyl starch ether which is, preferably, in suspension in an inert organic solvent medium.

The latter suspensions should contain from about 16 to 45% by weight, of the selected tertiary amino alkyl starch ether. As for the solvent, one may choose any organic solvent which is non-reactive with EI and does not yield inhibited products under the conditions which will be encountered in the process of this invention. In effect, the solvent acts as a diluent for the EI, thus promoting a uniform distribution of reagent and preventing any swelling of the starch. In fact, reaction efficiency may be additionally enhanced by further diluting the concentration of EI in the system by conducting the reaction by means of a so called "slow addition" technique whereby rather than introducing the entire concentration of EI into the system at the start of the reaction, it is instead slowly added, in small increments, over a period of about 15 to 30 minutes.

Applicable solvents for use in the reaction include such non-polar solvents as toluene, chloroform, heptane, and hexane as well as such polar solvents as triethylamine, dimethylformamide, dioxane, and dimethylsulfoxide and, preferably, mixtures of a polar and a non-polar solvent such, for example, as a mixture of toluene with dioxane or of toluene with dimethylformamide. Thus, I have found that the use, in the process of my invention, of such mixtures of polar with non-polar solvents results in a surprising increase in the efficiency of the reaction as indicated by a higher nitrogen content in the resulting derivatives. The reaction efficiency with these solvent blends is, in fact, substantially higher than the results which are achieved by the sole use of either a polar or a non-polar solvent.

In another variation of the above described basic procedure, one may utilize a so-called "dry technique" wherein one sprays or otherwise contacts a dry mass of the tertiary amino alkyl starch ether with a solution of the EI dissolved in any of the above listed solvents or solvent mixtures.

I have also found that an unexpected improvement of the dispersibility, in water, of the products of my invention may be obtained by impregnating the tertiary amino alkyl starch ether base in an aqueous solution of a polyvalent metal salt prior to the reaction of the starch base with EI. Particularly useful for this purpose is stannic chloride although other salts, such as aluminum chloride and titanium chloride may also be used.

In conducting this impregnation procedure, the tertiary amino alkyl starch ether base should be suspended, with agitation, in an aqueous solution of the selected salt for a period of about 15 to 60 minutes whereupon the starch ether base should be recovered by filtration and dried prior to its reaction with the EI. This procedure is quite helpful in making non-inhibited, i.e. readily dispersible, non-crosslinked, products in those cases where the tertiary amino alkyl ether is a potato starch base and especially in procedures where the EI is to be sprayed onto a dry mass of such a potato starch base.

As noted earlier, one may employ the acid salts, such as the hydrochloride salt, as well as the free amine form of the tertiary amino alkyl starch ethers in conducting the process of this invention. It has, however, been observed that the use of the acid salts of these starch ethers results in higher reaction efficiencies as the acid group of these salts appears, in some way, to be accelerating the reaction and promoting its overall efficiency. It is, therefore, preferred to employ these acid salts of the tertiary amino alkyl starch ethers in preparing the novel derivatives of my invention.

The concentration of EI which may be used in the process of my invention may vary from as little as about 0.05 up to about 100% of EI as based upon the weight of the tertiary amino alkyl starch ether undergoing reaction. Although still higher concentrations may be employed, there are no advantages to be derived therefrom and the cost of the resulting products becomes economically prohibitive.

According to Kerr and Neukom, the reaction of EI with starch will, in the absence of a catalyst, yield products having only simple substitution and no grafting of ethyleneimine side chains onto the starch molecule. On the other hand, according to U.S. Patent 2,972,606, the reaction of cellulose with EI does, in the presence of catalysts, result in grafting. Thus, since the tertiary amino alkyl starch ether bases utilized in my novel process contain tertiary amine groups whose acid salts, as noted above, act to accelerate the reaction and also serve as possible sites for substitution, it is therefore, entirely reasonable to assume that some grafting of ethyleneimine side chains onto the starch molecule is taking place in the process of my invention. This expectation is particularly valid when higher concentrations of EI, in the order of about 10%, or more, on the weight of the starch base are used. Moreover, the rate of grafting will ordinarily be directly related to the amount of tertiary amino alkyl substitution which is present in the starch ether base.

However, regardless of he amount of grafting which occurs, the resulting products of my invention exhibit a degree of performance in the paper making process which is, surprisingly, superior to the results obtained with either the EI-starch derivatives made according to the teaching of Kerr and Neukom or the tertiary amino alkyl starch ethers which are utilized as the starting materials in the process of my invention.

It may also be noted that the use of concentrations of EI above about 30%, by weight, of the tertiary amino alkyl starch ether base, results in gelatinized, i.e. cold water swelling, reaction products as is further attested to by the fact that the polarization cross of their individual starch granules has been substantially lost. As might be expected, the performance of my derivatives as paper making additives increases in a direct relation to the concentration of EI which is used in their preparation, and also upon the amount of nitrogen which is, accordingly, introduced therein.

The reaction between the EI and the tertiary amino alkyl starch ether may be conducted at temperature ranging from about 25 to 100° C. Although still higher temperatures may be utilized, care must be taken in order to avoid degradation of the starch ether base. Moreover, the use of temperature considerably above 100° C. will necessitate employing high pressure equipment. For optimum results, it is preferred to conduct this novel process at temperatures in the range of about 40 to 60° C. With regard to the overall length of the reaction period, I have found that at about 25° C., about 72 hours is required for the completion of the reaction whereas at 60° C., the reaction is essentially complete after about 22 to 24 hours.

Upon the completion of the reaction, the novel derivatives resulting therefrom may be readily recovered by filtration or decantation whereafter they need merely be washed with successive portions of methanol until the washing are found to be free of alkalinity as indicated by the absence of an alkaline reaction to pH paper. The derivatives may then be dried by any convenient means.

The novel cationic starch derivatives resulting from the process of my invention are, as noted earlier, superior in their performane as paper making additives to the tertiary amino alkyl starch ethers from which they are derived. Thus, I have found that their use as beater additives provides increased pigment retention along with an overall increase in the strength of the resulting paper sheet as compared to the results obtained by the use of an equivalent concentration of the tertiary amino alkyl starch ether. This superior performance thereby permits the use of lower concentrations of my derivatives in the paper making process. In addition to their use as wet-end additives, the products of my invention may also be employed in various other applications such as coating binders, flocculants, textile sizes and finishes, and as adhesives.

Although this disclosure has been limited to the products resulting from the reaction of EI with the above described tertiary amino alkyl starch ethers, it should be noted at this point that comparable products may also be prepared by the reaction of EI with: (a) the sulfonium starch ethers disclosed in U.S. Patent 2,989,-520, and (b) the phosphonium starch ethers disclosed in U.S. Patent 3,077,469.

The following examples will further illustrate the process of this invention. In these examples, all parts given are by weight, unless otherwise noted.

*Example I.*—This example illustrates the preparation of several of the novel derivatives of my invention and also demonstrates their improved performance as pigment retention aids in comparison with the tertiary amino alkyl starch ether base from which they were derived.

In preparing these derivatives, 100 parts of the hydrochloride salt of the diethyl amino ethyl ether of corn starch, as prepared by the reaction of corn starch with 3.0% by weight of beta-diethyl amino ethyl chloride hydrochloride by means of the procedure described in Example I of U.S. Patent 2,813,093, were in each case suspended in 125 parts of heptane and, with agitation, reacted with varying concentrations of EI at a temperature of 60° C. over a period of 24 hours. Each of the resulting reaction products was then recovered by filtration, washed with methanol until the washing showed no alkaline reaction to pH paper, and finally dried. In all cases, the resulting derivatives yielded aqueous dispersions which did not settle out or form cloudy layers on prolonged standing.

These derivatives were then utilized as paper making additives by being introduced into the beater or head box during the normal course of the paper making process. In each case, the pulp batch to which the derivative was added also contained 10% of titanium dioxide as based on the dry weight of the pulp. The degree of retention of the latter pigment in the resulting paper sheets was then determined by ashing the paper and weighing the resulting ash.

The following table provides data relating to the concentration of EI which was utilized for the preparation of each of the derivatives; the nitrogen content on a dry basis of the resulting derivative which is to be compared with the nitrogen content of the tertiary amino alkyl ether base which in all cases was 0.25% by weight on a dry basis; the concentration of the derivative which was added to the pulp as based on the dry weight of the pulp; and, the percent retention of the pigment in the various paper sheets prepared with the respective derivatives. The first and fourth lines in this table provide a comparison of the results obtained by the use, in the same manner, of the tertiary amino alkyl starch ether base.

| Derivative No. | Percent EI on Base | Percent Nitrogen in Derivative (on dry basis) | Percent Derivative Added to Pulp | Percent Retention of Titanium Dioxide |
| --- | --- | --- | --- | --- |
| Base | | 0.25 | 1.0 | 67.5 |
| 1 | 0.5 | 0.33 | 1.0 | 68.8 |
| 2 | 1.0 | 0.40 | 1.0 | 72.2 |
| 3 | 2.0 | 0.50 | 1.0 | 70.2 |
| Base | | 0.25 | 0.25 | 65.0 |
| 4 [1] | 20.0 | 3.93 | 0.25 | 70.5 |
| 5 [2] | 20.0 | 5.27 | 0.25 | 72.8 |
| 6 [3] | 60.0 | 8.18 | 0.25 | 77.0 |
| 7 | 60.0 | 6.03 | 0.25 | 74.0 |
| 8 | 100.0 | 9.50 | 0.25 | 79.0 |

[1] This procedure was conducted as a dry reaction by spraying the starch base with a solution of 20 parts of EI dissolved in 40 parts of dimethylformamide.

[2] This procedure was identical to the above described dry reaction with the exception that the solvent for the EI was triethylamine rather than dimethylformamide.

[3] In this procedure the EI was slowly added to the starch suspension in small increments over a 30 minute period.

The above data clearly indicate the superior pigment retention which is achieved by the use of the novel derivatives of my invention as compared with the results obtained by the use, as paper making additives, of the tertiary amino alkyl starch ethers from which these derivatives were prepared. Also demonstrated is the fact that as the concentration of the EI used in preparing these derivatives is increased, there is a corresponding rise in their performance as pigment retention aids. Thus, for example, with a derivative of my invention prepared by the use of 60% of EI, as based on the weight of the starch base, i.e. Derivative No. 6, it is possible to obtain almost a 10% improvement in pigment retention while using 75%, by weight, less of the derivative than of its tertiary amino alkyl ether base.

*Example II.*—This example illustrates the preparation of my novel derivatives utilizing a variety of different tertiary amino alkyl ether bases.

The following table describes the various tertiary amino alkyl starch ethers which were employed in preparing these derivatives.

*Description*

Base No.:
(1) The free amine form of the diethyl amino ethyl ether of corn starch is prepared by means of the procedure described in Example II of U.S. Patent 2,813,093.
(2) The quaternary ammonium salt of the diethyl amino ethyl ether of corn starch prepared by reacting the hydrochloride salt of the diethyl amino ethyl ether of corn starch with 50% by weight of methyl iodide according to the procedure described in Example VI of U.S. Patent 2,813,093.
(3) The hydrochloride salt of the diethyl amino ethyl ether of tapioca starch as prepared by means of the reaction described in Example III of U.S. Patent 2,813,093.
(4) The hydrochloride salt of the diethyl amino ethyl ether of a corn starch which had previously been oxidized with sodium hypochlorite to a degree known in the trade as 87 fluidity, as prepared by means of the procedure described in Example III of U.S. Patent 2,813,093.
(5) The hydrochloride salt of the dimethyl amino isopropyl ether of corn starch which had previously been acid converted to a degree known in the trade as 60 fluidity, as prepared by means of the procedure described in Example IV of U.S. Patent 2,813,093.
(6) The hydrochloride salt of the dibutyl amino 2-hydroxypropyl ether of corn starch, as prepared by means of the procedure described in Example V of U.S. Patent 2,813,093.
(7) The hydrobromide salt of the 2-bromo-5-diethyl amino pentane ether of corn starch, as prepared by means of the procedure described in Example VII of U.S. Patent 2,813,093.
(8) The hydrochloride salt of the diethyl amino ethyl ether of sago starch, as prepared by means of the procedure described in Example VIII of U.S. Patent 2,813,093.
(9) The hydrochloride salt of the dioctyl amino ethyl ether of corn starch, as prepared by means of the reaction described in Example XI of U.S. Patent 2,813,093.
(10) The 3-(N-methyl-N-phenyl)-amino - 2 - hydroxypropyl ether of corn starch.

In reacting the above described tertiary amino alkyl starch ether bases with EI, the following procedure was employed:

A sample of 100 parts of each base was sprayed with 20 parts of EI which had been diluted with 20 parts of triethylamine and thereupon reacted at 60° C. for a period of 24 hours. Each of the resulting reaction products was washed repeatedly with methanol until the washings were found to be devoid of any alkalinity whereupon it was dried. Other solvents, such as heptane, toluene and dimethylformamide were also used in various repetitions of these reactions.

In all cases, the derivatives resulting from the use of the above described intermediates in the process of my invention were found to display improved results as paper making additives in comparison with the results obtained when their underivatized intermediates were utilized.

*Example III.*—This example illustrates the use of a number of the lower alkyl homologs of EI in preparing the novel derivatives of my invention.

*Part A.*—In this procedure, 100 parts of the hydrochloride salt of the diethyl amino ethyl ether of corn starch were suspended in 600 parts of heptane to which suspension there was then added a solution of 57 parts of N-methylethyleneimine in 100 parts of heptane. The reaction was conducted, under agitation, at a temperature of 60° C. over a period of 16 hours. The product was recovered by filtration, washed with methanol until free of alkalinity and then dried. The resulting derivative had an increase in its nitrogen content of only 1.94%, by weight on a dry basis, versus a calculated increase of 8.9% over the nitrogen content of the starch ether base in spite of the high concentration of N-methylethyleneimine which had been utilized in its preparation. Moreover, this derivative displayed a rather limited degree of water dispersibility.

*Part B.*—In this procedure, the reaction was conducted in a manner identical to that described for Part A, hereinabove, with the exception that 72 parts of 2,2-dimethylethyleneimine were utilized in place of the 57 parts of N-methylethyleneimine. The resulting derivative had an increase in its nitrogen content of only 1.26%, by weight on a dry basis, over the nitrogen content of the starch ether base in spite of the high concentration of 2,2-dimethylethyleneimine which had been utilized in its preparation. Moreover, this derivative displayed only a rather limited degree of water dispersibility.

The properties of the above described derivatives serve to indicate that the use of the lower alkyl homologs of EI does not give results comparable to those obtained by the use of EI in the process of this invention.

*Example IV.*—This example compares the performance of the products obtained upon the reaction of EI with ordinary starch with the performance obtained utilizing the novel products of my invention comprising the reaction products of EI with the above described tertiary amino alkyl starch ethers. In each of the following experiments, bleached sulfite pulp having a freeness of 400 was utilized in a concentration of about 0.5% by weight, while the concentration of the titanium dioxide was 10% as based upon the bone dry weight of the pulp.

*Part A.*—In this procedure, the technique of Kerr and Neukom was followed and 100 parts of raw corn starch were suspended in 125 parts of heptane and, with agitation, reacted with 50 parts of EI at a temperature of 60° C. over a period of 24 hours. The resulting reaction product was recovered by filtration, washed with methanol until the washings showed no alkaline reaction to pH paper, and then dried. This derivative was thereupon utilized as a pigment retention aid in the manner described in Example I, hereinabove. It was added to the headbox in a concentration of 0.25%, as based on the dry weight of the pulp which also contained 10%, by weight, of titanium dioxide. Analysis of the resulting paper sheets indicated a degree of pigment retention of 66%. It may also be noted that this derivative displayed a poor degree of water dispersibility.

*Part B.*—In this procedure, 100 parts of raw corn starch were suspended in 200 parts of dimethylformamide in which there were also dispersed, as a catalyst for the reaction, 0.8 part of stannic chloride pentahydrate. With agitation, the starch was then reacted with 60 parts of EI at a temperature of 60° C. for a period of 24 hours. The resulting reaction product was recovered by filtration, washed with methanol until the washings showed no alkaline reaction to pH paper, and then dried. This derivative was thereupon utilized as a pigment retention aid in the manner described in Example I, hereinabove. It was added to the beater in a concentration of 1.0%, as based on the dry weight of the pulp which also contained 10%, by weight, of titanium dioxide. Analysis of the resulting paper sheets indicated a degree of pigment retention of 60.8%. It may also be noted that this derivative displayed a poor degree of water dispersibility.

The performance, as pigment retention aids, of the above described reaction products of EI with raw corn starch is thus seen to be quite inferior with respect to the results obtained with the novel derivatives of my invention as illustrated by the pigment retention data presented in Example I, hereinabove. The present results thus point out the criticality of using only the specified tertiary amino alkyl starch ethers as the intermediates for the preparation of the novel derivatives of my invention.

*Example V.*—This example illustrates the increased reaction efficiency, as evidenced by a higher nitrogen content in the resulting derivatives, which results from the presence of higher concentrations of tertiary amino alkyl groups in the starch bases utilized in the process of this invention.

A number of 100 part portions of different diethyl amino ethyl ethers of potato starch having varying nitrogen contents, as indicated below, were reacted, respectively, for 24 hours at 60° C., with 100 parts of EI in 100 parts of a solvent mixture comprising a 2:1:1:1 chloroform:triethylamine:dioxane:heptane blend. The resulting products were washed with successive portions of methanol and then air dried.

The following table provides data relating to the nitrogen content of the starting starch ether bases versus the nitrogen content of the products derived therefrom.

| Percent Diethyl Amino Ethyl Nitrogen | Percent Total Nitrogen in Product | Percent Nitrogen Introduced via Reaction with EI |
|---|---|---|
| (1) | 4.27 | 4.27 |
| 0.14 | 5.75 | 5.61 |
| 0.27 | 6.75 | 6.48 |
| 0.37 | 8.43 | 8.06 |

[1] Control comprising raw potato starch.

*Example VI.*—This example illustrates the improved reaction efficiency, in the process of my invention, which results from the use, as a reaction medium, of a blend of a polar with a non-polar solvent.

Using the reaction procedure described in Example V, hereinabove, 20 parts of EI was reacted, respectively, with a number of 100 part portions of the identical diethyl amino ethyl ether of potato starch. Each of the various samples was, however, reacted in 20 parts of a different solvent or solvent blend. The following table identifies the solvents or solvent blends which were used and also indicates the percent total nitrogen which was present in the resulting reaction products.

Solvent used:            Percent total nitrogen in product
100% toluene _____ 3.88
An 80:20 toluene:dimethylformamide blend __ 4.38
A 50:50 toluene:dimethylformamide blend ___ 4.59
100% dimethylformamide _____ 3.93

*Example VII.*—This example illustrates the improved dispersibility, in water, resulting from the impregnation of the starch ether base in a solution of a polyvalent metal salt prior to the reaction of the base with EI.

A number of 100 part portions of different diethyl amino ethyl ethers of potato starch having varying nitrogen contents, as indicated below, were suspended, respectively, in solutions comprising 0.5 part of stannic chloride dissolved in 100 parts of water which was at a temperature of 25° C. Each suspension was agitated for 15 minutes whereupon the starch base was recovered by filtration and air dried.

The recovered starch bases were then reacted with EI according to the procedure described in Example V, hereinabove. As a control for the experiment, portions of the identical starch ether bases which, in this case, had not been suspended in stannic chloride solutions, were then similarly reacted with EI.

The dispersibility of each of the thus prepared products was then evaluated by means of a settling test which involved cooking a 0.1%, by weight, aqueous dispersion of each product, for a period of 15 minutes, over a boiling water bath. The cooked dispersions were then placed into a series of 100 milliliter graduated cylinders and allowed to stand for 16 hours at room temperature. The appearance of a dense, cloudy layer at the bottom of the cylinder would thus indicate poor dispersibility whereas the absence of such a dense, cloudy layer would indicate good dispersibility. The following table presents the results of these tests.

| Percent Nitrogen in Base | Percent Nitrogen in Product | Percent Stannic Chloride on Starch | Evaluation of Dispersibility as indicated by the Height (in mls. of H₂O) of the Cloudy Layer | |
|---|---|---|---|---|
| 0.14 | 4.88 | 0.5 | Excellent | 0.0 |
| 0.27 | 5.86 | 0.5 | ----do---- | 0.0 |
| 0.47 | 6.19 | 0.5 | ----do---- | 0.0 |
| 0.14 | 5.75 | None | Poor | 0.8 |
| 0.27 | 6.75 | None | ----do---- | 10.0 |
| 0.37 | 8.43 | None | ----do---- | 4.0 |

The above data indicate that although the impregnation in stannic chloride resulted in a slightly poorer reaction efficiency, as indicated by the lower nitrogen content of the resulting derivatives, the dispersibility of the products derived from the impregnated bases was far superior to the dispersibility observed in the controls.

Summarizing, this invention is seen to provide a process for the preparation of novel cationic starch derivatives. Variations may be made in proportions, procedures and materials without departing from the scope of this invention which is limited only by the following claims.

What is claimed is:

1. A cellulosic paper having intimately dispersed therein a novel cationic starch derivative having the structural formula:

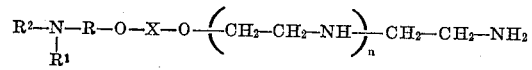

wherein X is starch, R is a radical selected from the group consisting of alkylene and hydroxyalkylene radicals, each of R¹ and R² is a radical selected from the group consisting of alkyl, aryl and aralkyl radicals, and n is an integer having a value of at least 0.1; said derivative containing on a dry basis from about 0.08 to 10.0% by weight of nitrogen.

2. In the manufacture of paper wherein an aqueous dispersion of pulp is formed into a sheet, the step which comprises adding to the aqueous dispersion of the pulp, prior to the ultimate removal of the water therefrom, a novel cationic starch derivative having the structural formula:

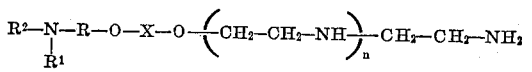

wherein X is starch, R is a radical selected from the group consisting of alkylene and hydroxyalkylene radicals, each of $R^1$ and $R^2$ is a radical selected from the group consisting of alkyl, aryl and aralkyl radicals, and $n$ is an integer having a value of at least 0.1; said derivative containing on a dry basis from about 0.08 to 10% by weight of nitrogen.

No references cited.

DONALD E. CZAJA, *Primary Examiner.*

LEON J. BERCOVITZ, *Examiner.*

R. W. MULCAHY, *Assistant Examiner.*